R. W. LESLEY.
UTILIZATION OF LOW GRADE CARBONIFEROUS MATERIAL.
APPLICATION FILED APR. 21, 1919.

1,323,294.

Patented Dec. 2, 1919.

WITNESS:

INVENTOR
Robert W. Lesley
BY
Redding & Greeley
ATTORNEYS

UNITED STATES PATENT OFFICE.

ROBERT W. LESLEY, OF HAVERFORD, PENNSYLVANIA.

UTILIZATION OF LOW-GRADE CARBONIFEROUS MATERIAL.

1,323,294.  Specification of Letters Patent.  Patented Dec. 2, 1919.

Application filed April 21, 1919.  Serial No. 291,704.

*To all whom it may concern:*

Be it known that I, ROBERT W. LESLEY, a citizen of the United States, residing in Haverford, in the State of Pennsylvania, have invented certain new and useful Improvements in Utilization of Low-Grade Carboniferous Material, of which the following is a specification, reference being had to the accompanying drawings, forming a part hereof.

There are found in various parts of the world extensive deposits and accumulations of low grade carboniferous material, such, for example, as oil shale, lignite, low grade bituminous and cannel coal and waste or dirty coal in dumps, which contains a considerable percentage of volatile constituents, such as hydrocarbons, ammonia, etc., a considerable percentage of non-volatile or fixed carbon, which is nevertheless combustible, and a large percentage of ash or non-combustible residue. The proportion of the latter constituent is so great that the raw material is incapable of economical use as fuel in its original form or even after subjection to a process of distillation, the presence and proportion of the ash or non-combustible constituents preventing the coking of the fixed carbon which is mingled with the non-combustible material. The separation of the fixed carbon from the ash or residue is impracticable and thus far there has been disclosed no practicable method of making use of the very substantial percentage of fixed carbon contained in many of such materials. It is a further fact, however, that the ash or residue, largely of an argillaceous character, is a suitable material for the manufacture of Portland cement in combination with the calcareous or other ingredients. It is the purpose of this invention to enable all of the useful constituents of low grade carboniferous material to be made use of and at the same time to reduce materially the cost of manufacture of Portland cement. In the practice of the invention the low grade carboniferous material is subjected first to a process of distillation by which the volatile constituents, including hydrocarbons, fixed gas, ammonia, etc., are separated from the residue. Then the residue, because of its value as one of the constituents of cement, is subjected to a clinkering process, with heat, generally with the addition of other cement raw material, such as calcareous material, as may be necessary according to the character of the residue. In the clinkering process the fixed carbon, which is carried with the argillaceous or other material of the residue, constitutes, in the clinkering process, a proportion at least of the fuel by which the clinkering is effected. Such proportion may be small or large according to the richness of the carboniferous material, but for most of the materials suggested it will be found that the quantity of fixed carbon in the argillaceous material required is enough to supply nearly all of the fuel required in the clinkering process after combustion has once been established in the kiln. Thereby the expense of procuring and preparing fuel for the clinkering of cement raw materials is largely eliminated. The invention will be described briefly with reference to the accompanying drawing in which is illustrated one form of apparatus adapted for the practice of the method, and in which—

Figure 1:
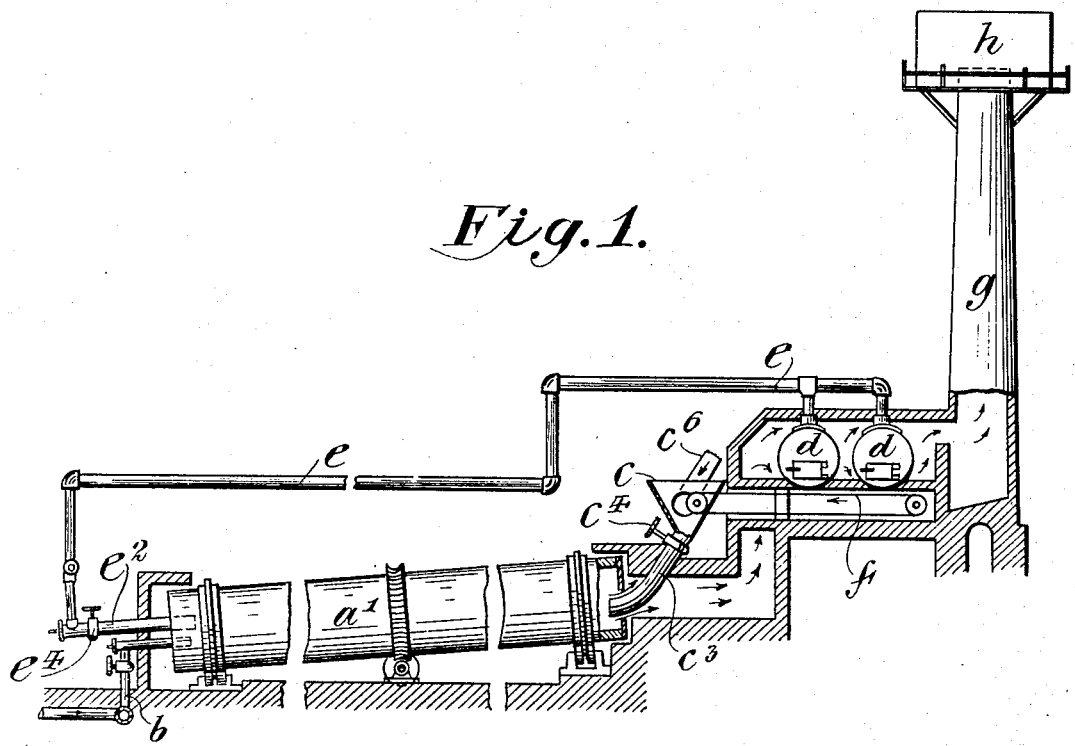
Figure 1 is a conventional view, partly in elevation and partly in section, of an apparatus in which the invention may be practised.
Figure 2:
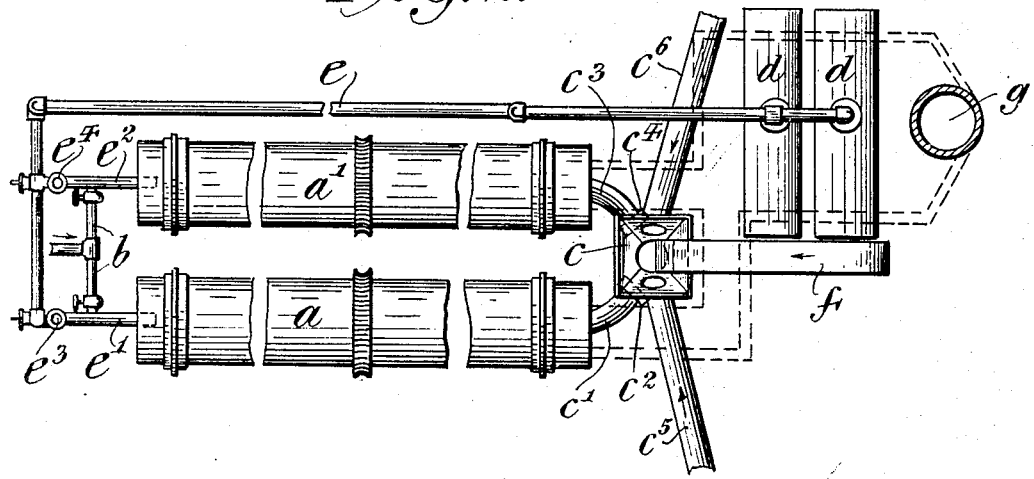
Fig. 2 is a view of the same as seen from above.

The apparatus represented in the drawing is shown as having two rotary kilns $a$ and $a'$, such as are commonly employed in the calcining of cement raw materials to form cement clinker, to the lower or discharge end of which any suitable fuel may be supplied, a gas or oil supply pipe being indicated at $b$. The material to be treated in the kilns is fed in as usual at the upper end, a single feed hopper being indicated at $c$, with a suitable pipe $c'$ to conduct the material from the hopper of the kiln $a$ and having a gate, as at $c^2$, and with a suitable pipe $c^3$ to conduct the material from the hopper to the kiln $a'$, also having a gate $c^4$. At $c^5$ and $c^6$ are indicated means for supplying desired cement raw materials to the hopper $c$.

From the upper end of each kiln hot gases pass eventually to a stack $g$ which may be equipped with the usual apparatus indicated at $h$ for the extraction of potash, ammonia, etc., from the spent gases. Before the hot gases from the kiln reach the stack, however, they are made to give up their heat in large measure to retorts $d$ which are charged with the low grade carboniferous material. It will be observed that the hot gases which escape from the clinkering process are not brought directly into contact with the carboniferous material, but are applied to the same externally, the heat acting through the walls of the retorts to separate the volatile constituents of the carboniferous material from the ash or residue. The waste gases from rotary kilns, as now commonly used in the manufacture of Portland cement, pass off with a temperature of from 1000° F. to 1400° F., while the heat required for the distillation of such carboniferous material as those referred to varies from about 800° F. for the lighter oils to about 1300° F. for the heavier oils. The heat furnished by the waste gases from the kilns is therefore usually sufficient to carry on the distillation of such materials.

The valuable elements of the volatile constituents thus separated from the residue may be recovered in any usual manner, the conductor $e$ leading the vapors to the apparatus in which valuable constituents are recovered. As shown in the drawing the conductor $e$ may conduct the permanent, combustible gas which is evolved in the retorts and has great fuel value, directly to the kilns $a$ and $a'$, through the branches $e'$ and $e^2$, provided with suitable valves $e^3$ and $e^4$, in order that the gas or some of the gas may be used, if necessary, in the clinkering process by way of supplement to the fuel derived from other sources.

The residue which remains after the process of distillation of the carbonaceous material is generally argillaceous in character and immediately available for use as one of the components of Portland cement and for mixture with calcareous material for calcination therewith. Suitable means, conventionally illustrated by the conveyer $f$, are provided for conveying ash or residue from the retorts $d$ after the distillation is completed, to the hopper $c$ from which it is delivered to one or the other of the kilns, after having been mixed on the way with the proper quantity of calcareous material. Such ash or residue carries with it a very considerable proportion of fixed carbon, not volatile or not highly volatile and not separated from the residue in the process of distillation, but nevertheless having a high fuel value. Therefore, when combustion has once been established in the kilns by the introduction of fuel from some external source, as through the pipe $b$, the fixed carbon which passes into the kiln with the ash or residue is ignited therein and furnishes a corresponding part of the fuel required in the operation. It is necessary in every instance to provide fuel from some other source for the purpose of bringing the kiln up to the proper temperature and establishing the combustion, but when the combustion has once been established it will be possible to reduce very largely the quantity of fuel supplied from the external source. With many of the kinds of carboniferous material referred to it will be found that the material itself furnishes the greater part of the fuel required in the clinkering operation.

It will be understood that the invention can be practised in any suitable form of apparatus and that it is not limited to the treatment of any one particular carboniferous material but is capable of application to the treatment of many forms of carboniferous material which are now not used at all in any way or are used only for the production of gases, etc., by a distillation while the fixed carbon goes to waste.

I do not herein claim the apparatus above shown and described as that forms the subject-matter of a separate application filed by me on September 3, 1918, Serial No. 252,312.

I claim as my invention:

1. The method of utilizing low grade carboniferous material in the manufacture of cement which consists in clinkering cement raw materials with heat, applying the heat escaping from the clinkering process externally to the carboniferous material and thereby separating the volatile constituents of the carboniferous material from the residue and burning in the clinkering process volatile constituents of the carboniferous material thus separated.

2. The method of utilizing low grade carboniferous material in the manufacture of cement, which consists in separating the volatile constituents of the carboniferous material from the residue by externally applied heat, mixing the residue with other cement raw material, and applying gases so separated from the carboniferous material to the mixture as fuel for effecting the clinkering thereof.

3. The method of utilizing low grade carboniferous material in the manufacture of cement which consists in separating the volatile constituents of the carboniferous material from the residue by externally applied heat, mixing the residue with other cement raw material, applying gases so separated from the carboniferous material to the mixture as fuel for effecting the clinkering thereof, and heating the carboniferous material by the products of combustion of the clinkering process.

4. The method of utilizing low grade carboniferous material in the manufacture of cement which consists in separating the volatile constituents of the carboniferous material from the residue by externally applied heat, and clinkering the residue with combustion of the fixed carbon retained in the residue.

5. The method of utilizing low grade carboniferous material in the manufacture of cement which consists in separating the volatile constituents of the carboniferous material from the residue by externally applied heat, mixing the residue with other cement raw material and clinkering the mixture with combustion of the fixed carbon retained in the residue.

6. The method of utilizing low grade carboniferous material in the manufacture of cement which consists in separating the volatile constituents of the carboniferous material from the residue by externally applied heat, mixing the residue with calcareous material and clinkering the mixture with combustion of the fixed carbon in the residue and added fuel.

7. The method of utilizing oil-bearing shale in the manufacture of cement, which consists in clinkering the cement raw materials with heat, applying the heat escaping from the clinkering process externally to the oil bearing shale and thereby separating volatile constituents of the shale from the residuum and burning volatile constituents thus separated in the clinkering process.

8. The method of utilizing oil-bearing argillaceous shale in the manufacture of cement, which consists in separating volatile constituents of the shale from the residuum by externally applied heat, mixing the residuum with calcareous material, and applying gases from the shale to the mixture as fuel for effecting the clinkering thereof.

9. The method of utilizing oil-bearing argillaceous shale in the manufacture of cement, which consists in separating volatile constituents of the shale from the residuum by externally applied heat, mixing the residuum with calcareous material, applying gases from the shale to the mixture as fuel for effecting the clinkering thereof, and heating the shale by the products of combustion of the clinkering process.

This specification signed this 16th day of April, A. D. 1919.

ROBERT W. LESLEY.